(12) United States Patent
Hoelzl et al.

(10) Patent No.: US 11,994,370 B2
(45) Date of Patent: May 28, 2024

(54) METHOD FOR OPERATING AN ELECTRONIC DAZZLING ELEMENT, AND ELECTRONIC DAZZLING ELEMENT

(71) Applicant: Diehl Stiftung & Co. KG, Nuremberg (DE)

(72) Inventors: Johannes Hoelzl, Erlangen (DE); Wolfgang Cabanski, Heilbronn (DE); Oliver Klettke, Nuremberg (DE); Robert Stark, Bad Windsheim (DE); Mathias Glasmacher, Reilingen (DE)

(73) Assignee: Diehl Stiftung & Co. KG, Nuremberg (DE)

( * ) Notice: Subject to any disclaimer, the term of this patent is extended or adjusted under 35 U.S.C. 154(b) by 483 days.

(21) Appl. No.: 17/246,905

(22) Filed: May 3, 2021

(65) Prior Publication Data

US 2021/0270577 A1 Sep. 2, 2021

Related U.S. Application Data

(63) Continuation of application No. PCT/EP2019/079438, filed on Oct. 28, 2019.

(30) Foreign Application Priority Data

Nov. 2, 2018 (DE) .......................... 102018008662.4

(51) Int. Cl.
*F41H 13/00* (2006.01)
*H05B 47/16* (2020.01)

(52) U.S. Cl.
CPC ......... *F41H 13/0087* (2013.01); *H05B 47/16* (2020.01); *F41H 13/0056* (2013.01)

(58) Field of Classification Search
CPC .......................... F41H 13/0056; F41H 13/0087
See application file for complete search history.

(56) References Cited

U.S. PATENT DOCUMENTS

| | | | |
|---|---|---|---|
| 6,856,636 B2 | 2/2005 | Ohgoh et al. | |
| 8,113,689 B2 | 2/2012 | Mayo et al. | |
| 8,419,213 B1* | 4/2013 | Rubtsov | H05B 45/20 |
| | | | 362/249.02 |
| 9,574,749 B2 | 2/2017 | Trail et al. | |
| 2005/0243224 A1 | 11/2005 | Choi et al. | |
| 2009/0040764 A1 | 2/2009 | Hugues et al. | |
| 2011/0116257 A1 | 5/2011 | Eisenberg et al. | |
| 2015/0233682 A1* | 8/2015 | Devaux | F41H 13/0087 |
| | | | 89/1.11 |
| 2018/0216919 A1 | 8/2018 | Palti | |

FOREIGN PATENT DOCUMENTS

| | | |
|---|---|---|
| DE | 202008006658 U1 | 1/2009 |
| EP | 3023730 A1 | 5/2016 |
| EP | 3023731 A1 | 5/2016 |
| WO | 2016048708 A1 | 3/2016 |

* cited by examiner

*Primary Examiner* — Robert J May
(74) *Attorney, Agent, or Firm* — Laurence A. Greenberg; Werner H. Stemer; Ralph E. Locher

(57) ABSTRACT

In an electronic dazzling element having at least one optical emitter with at least one electronic light-emitter for emitting light pulses, the light-emitter of the at least one optical emitter is controlled in such a way that a light pulse sequence emitted by the light-emitter is adapted to the physiology of the human eye.

13 Claims, 2 Drawing Sheets

US 11,994,370 B2

METHOD FOR OPERATING AN ELECTRONIC DAZZLING ELEMENT, AND ELECTRONIC DAZZLING ELEMENT

CROSS-REFERENCE TO RELATED APPLICATION

This application is a continuation, under 35 U.S.C. § 120, of copending international application No. PCT/EP2019/079438, filed Oct. 28, 2019, which designated the United States; this application also claims the priority, under 35 U.S.C. § 119, of German patent application No. 10 2018 008 662.4, filed Nov. 2, 2018; the prior applications are herewith incorporated by reference in their entirety.

BACKGROUND OF THE INVENTION

Field of the Invention

The present invention relates to a method for operating an electronic dazzling element for emitting light pulses and to an electronic dazzling element for emitting light pulses.

To disorient people and confuse sensor systems, what are known as flash grenades are used, which are intended to bring about short-time blindness and disorientation through the emission of light pulses of high intensity. In addition to pyrotechnic flash grenades, in which the light pulses are generated by an explosion reaction, electronic flash grenades in which the light pulses are generated by electronic emitters containing light emitting means such as LEDs or laser diodes that are controllable by a control device have now also become known. Such electronic dazzling elements are disclosed, for example, in published European patent applications EP 3 023 730 A1 and EP 3 023 731 A1.

BRIEF SUMMARY OF THE INVENTION

It is the object of the invention to create an improved system for bringing about an effective disorienting effect with an electronic dazzling element.

This object is achieved by means of the teaching in the independent claims. The dependent claims relate to particularly advantageous configurations and developments of the invention.

In the method according to the invention for operating an electronic dazzling element having at least one optical emitter with at least one electronic light-emitting means for emitting light pulses, the light-emitting means of the optical emitter is controlled in such a way that a light pulse sequence emitted by the light-emitting means is adapted to the physiology of the human eye.

While the primary aim in electronic dazzling elements has so far been the emission of continuous sequences of light pulses with high light intensities in order to bring about the greatest possible dazzling effect on a target person without causing eye damage, the invention proposes that the emitted light pulse sequence be adapted to the physiology of the human eye and in this way a more effective dazzling and disorienting effect on target persons be brought about. The strongest possible dazzling and disorienting effect can thus also be caused with less electrical energy consumption. As a result, the size, weight and thermal management of the dazzling element can also be improved.

The adaptation according to the invention of the light pulse sequence emitted by the light-emitting means of the optical emitter of the dazzling element to the physiology of the human eye can include one or, in combination, a plurality of the aspects explained below.

In one configuration of the invention, the light pulse sequence contains a disorientation sequence in which alternately, one after the other, a plurality of dazzle pulse sequences with a plurality of dazzle pulses are emitted to bring about a disorienting effect on a target person and a plurality of dazzle pauses without such dazzle pulses are emitted, wherein a period duration of one sequence containing a dazzle pulse sequence and a subsequent dazzle pause does not exceed 250 ms. Two or three dazzle pulses are preferably emitted in one dazzle pulse sequence. The duration of a dazzle pulse sequence is preferably a maximum of approximately 200 ms and a duration of a dazzle pause is at least approximately 50 ms. In a preferred embodiment, the period duration of a dazzle pulse sequence and of a dazzle pause is approximately 200 ms. This configuration of the invention takes into account the blink reflex of the human eye, which ends after no more than 250 ms.

In one configuration of the invention, the light pulse sequence contains a disorientation sequence in which a plurality of dazzle pulses are emitted to bring about a disorienting effect on a target person, and, in addition, a pre-sequence preceding the disorientation sequence in which stimulus light, which is perceptible by a target person, is emitted with-out any disorienting effect on the target person. The stimulus light preferably has a luminance of at most approximately $1 \times 10^3$ cd/m$^2$, for example approximately 200 or 500 cd/m$^2$. The stimulus light can be emitted continuously or in a pulsed manner. In this configuration of the invention, the stimulus light preceding the disorientation sequence is intended to cause the target person to unconsciously direct their gaze to the dazzling element so that the subsequent dazzle pulses in the disorientation sequence can bring about a greater dazzling effect on the target person.

In one configuration of the invention, the light pulse sequence contains a disorientation sequence in which a plurality of dazzle pulses are emitted to bring about a disorienting effect on a target person, wherein the dazzle pulses each have a luminance of at most $1.6 \times 10^6$ cd/m$^2$. The dazzle pulses preferably each have a luminance of at least approximately $1 \times 10^4$ cd/m$^2$, more preferably at least about $1 \times 10^5$ cd/m$^2$. In a preferred embodiment, the dazzle pulses each have a luminance of approximately $1.0 \times 10^6$ cd/m$^2$. Two or three dazzle pulses are preferably emitted in one dazzle pulse sequence. This configuration of the invention takes into account that, starting from a luminance of approximately $1.6 \times 10^6$ cd/m$^2$, the human eye can no longer adapt, i.e. the cones are saturated and no change in messenger substance is generated any more at the bipolar cells.

In one configuration of the invention, the light pulse sequence contains a disorientation sequence in which a plurality of dazzle pulses are emitted to bring about a disorienting effect on a target person, wherein the dazzle pulses each have a pulse slope in the range from $0.5 \times 10^5$ cd/m$^2 \cdot$ms to $2.0 \times 10^5$ cd/m$^2 \cdot$ms. Two or three dazzle pulses are preferably emitted in one dazzle pulse sequence. In this configuration of the invention, the steepness of the dazzle pulses is adapted to the characteristic of the human eye in order to bring about the most optimized dazzling and disorienting effect.

In one configuration of the invention, the light pulse sequence contains a disorientation sequence in which a plurality of dazzle pulses are emitted to bring about a disorienting effect on a target person, wherein the dazzle pulses each have a pulse width in the range from 20 ms to 50 ms. The dazzle pulses preferably each have a pulse width of at least approximately 30 ms and/or of at most approximately 40 ms. Two or three dazzle pulses are preferably emitted in one dazzle pulse sequence. In this configuration of the invention, the pulse width of the dazzle pulses is adapted to the characteristic of the human eye in order to bring about the most optimized dazzling and disorienting effect.

In one configuration of the invention, at least one stimulus pulse is emitted in each of the dazzle pauses of the disorientation sequence without bringing about a disorienting effect on the target person. One or two stimulus pulses are preferably emitted during a dazzle pause. The stimulus pulses preferably each have a luminance of at most approximately $1 \times 10^4$ cd/m². In this configuration of the invention, the stimulus pulses during the dazzle pauses of the disorientation sequences are in each case intended to cause the target person to unconsciously direct their gaze (for the first time or again) to the dazzling element so that the dazzle pulses in the subsequent disorientation sequence can bring about a greater dazzling effect on the target person.

In a further configuration of the invention, the light pulse sequence contains a disorientation sequence in which a plurality of dazzle pulses are emitted to bring about a disorienting effect on a target person, wherein the dazzle pulses have such pulse widths and light in-tensities that they generate, at a defined distance from the dazzling element, an irradiance below a maximum permissible exposure of a target person. The generated irradiance should preferably have a fixed ratio of at most 100% to a reference value indicating the maximum permissible exposure. The maximum permissible exposure (or the reference value) can be indicated, for example, by an MPE value according to the standard DIN EN 60825-1. The maximum permissible exposure is generally dependent on the wavelength of the emitted dazzle pulses. With this configuration of the invention, a target person can be severely dazzled without causing damage to their health, wherein a reference value related to the physiological effect is used as the limit value for the irradiance.

In a variant of this embodiment, distances between the dazzling element and at least one target person are captured and the defined distance is determined as a function of the captured distances. If a plurality of target persons are captured, the smallest of the captured distances is preferably used to determine the defined distance. A typical body size of target persons, for example, is included in the determination of the defined distance from the captured target person distances in order to take into account the position height of the eyes above the plane of the dazzling element. The distance is preferably captured with a distance sensor in/at the dazzling element.

In the case when a plurality of dazzling elements are used, the light pulse sequence emitted by the light-emitting means in this embodiment variant is preferably adapted to the distances from target persons captured by the other dazzling elements.

In another variant of the above embodiment, the defined distance is an expected minimum distance between the dazzling element and the eyes of a target person of, for example, approximately 2 m.

In a further configuration of the invention, the light pulses from the optical emitter are emitted as collimated light beams. The dazzling effect can be further increased by collimating the light beams.

In a still further configuration of the invention, if a plurality of dazzling elements are used, the light pulse sequence emitted by the light-emitting means is adapted to the light pulse sequences emitted by the light-emitting means of the other dazzling elements.

The electronic dazzling element according to the invention has at least one optical emitter with at least one electronic light-emitting means for emitting light pulses and a control device for controlling the light-emitting means of the optical emitter, wherein the control device is configured such that it controls the light-emitting means of the optical emitter in such a way that a light pulse sequence emitted by the light-emitting means is adapted to the physiology of the human eye. The control device is preferably configured to carry out the method discussed above for operating the dazzling element according to the present invention.

It is possible to achieve the same advantages with a dazzling element of such a design as with the above-described method of the invention.

The electronic dazzling element has at least one optical emitter, preferably a plurality of optical emitters. The optical emitters each contain an electronic light-emitting means, preferably LEDs or laser diodes or LED arrays or laser arrays. It is also advantageous if the light-emitting means contain LEDs or laser diodes in different emission colors so as to form what are known as RGB clusters.

In addition to the at least one optical emitter, the dazzling element preferably also has at least one acoustic emitter for emitting sound pulses. In this way, the disorienting effect of the dazzling element can be further increased. The acoustic emitters preferably contain electronic sound generators such as piezoelectric sound transducers.

In one configuration of the invention, a communication device can additionally be provided, which is connected to the control device to the effect that the control device of the dazzling element can communicate with control devices of other optical and/or acoustic disorientation elements and/or with a higher-level controller in order to coordinate the controlling of the emitters of the various disorientation elements with respect to one another.

In one configuration of the invention, the dazzling element furthermore has an integrated energy store. The energy store is preferably a rechargeable energy store. The energy store can be charged in a contactless manner (e.g. inductively) or via a connector plug.

In one configuration of the invention, the dazzling element furthermore has a self-destructing device for self-destructing the dazzling element, in particular its control device. Self-destruction, which is preferably triggered by remote control, can prevent the dazzling element from being taken into possession by third parties and being used against oneself.

Other features which are considered as characteristic for the invention are set forth in the appended claims.

Although the invention is illustrated and described herein as embodied in a method for operating an electronic dazzling element, and an electronic dazzling element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
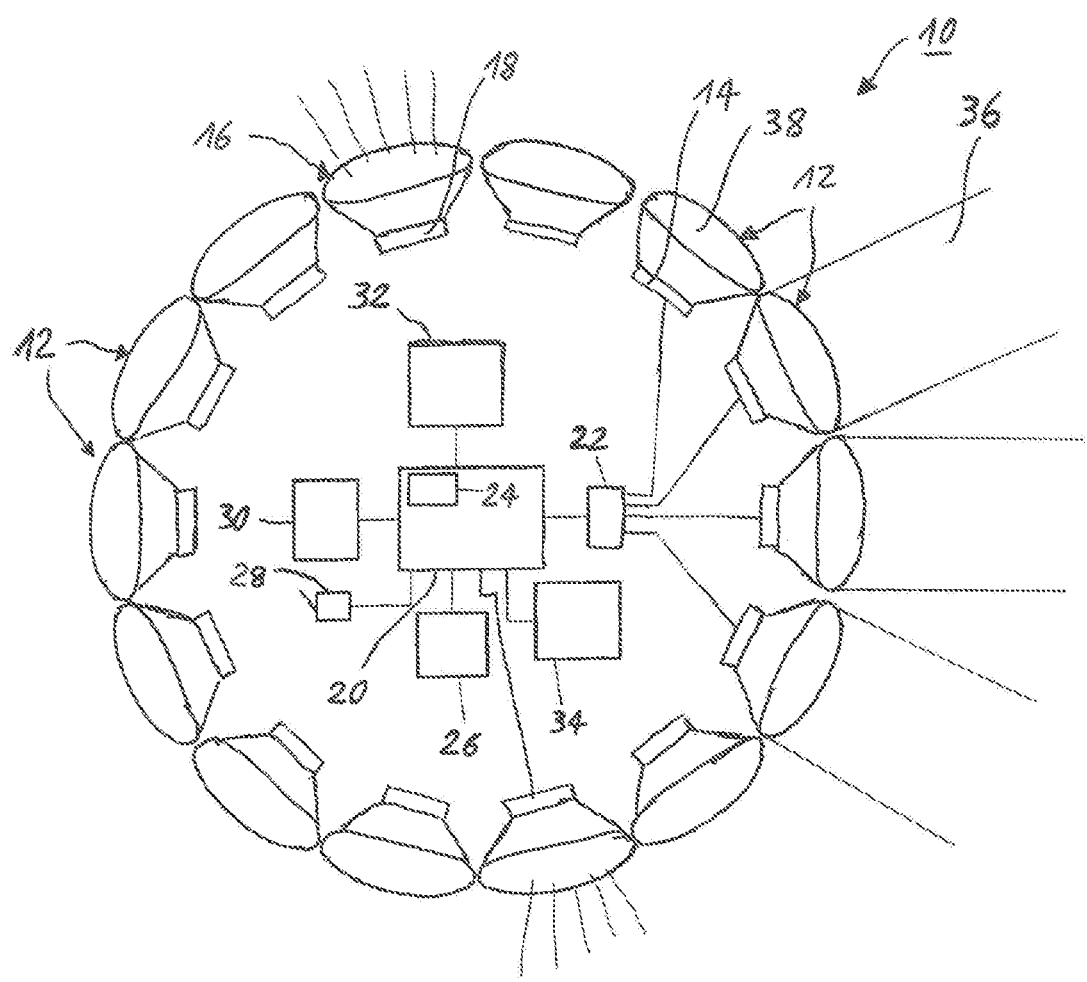
FIG. 1 is a schematic diagram of an electronic dazzling element according to an exemplary embodiment of the present invention.

Referring now to the figures of the drawings in detail and first, particularly to FIG. 1 thereof, there is shown a dazzling element 10 which has a substantially cylindrical or spherical housing, on the outer surface of which a number of optical emitters 12 are arranged. The optical emitters 12 each contain an electronic light-emitting means 14 for generating light pulses, such as LEDs, LED arrays, laser diodes or laser arrays. In order to improve the disorienting effect, the dazzling element 10 is preferably also equipped with at least one acoustic emitter 16. The acoustic emitters 16 each contain an electronic sound generator 18 for generating sound pulses, such as, for example, a piezoelectric sound transducer.

The electronic light-emitting means 14 of the optical emitters 12 are controlled by a control device 20 via a driver 22 connected therebetween. The electronic sound generators 18 of the acoustic emitters 16 are likewise controlled by the control device 20. For the sake of clarity, only some of the wired or wireless connections between the control device 20 and the light-emitting means 14 or sound generators 18 of the emitters 12, 16 are shown in FIG. 1.

The control device 20 preferably contains a timer 24. The dazzling element 10 is also equipped with an energy store 26, preferably a rechargeable energy store, for supplying energy to the electronic components of the dazzling element 10.

The control device 20 is additionally connected to an activation switch 28 and/or a release mechanism, which can be actuated, for example, before the dazzling element 10 is thrown. Furthermore, the dazzling element 10 contains a (for example electromagnetic or acoustic or optical) distance sensor 30 for capturing a distance between the dazzling element 10 and an object, in particular a target person. In the exemplary embodiment of FIG. 1, the dazzling element 10 additionally optionally contains a communication device 32, via which the control device 20 can communicate with the control devices of other dazzling elements and/or with a higher-level controller.

The activation switch 28, the release mechanism, a distance sensor 30, and the communication device 32 serve as an activation mechanism for activating the control device 20, so that it controls the light-emitting means 14 of the optical emitters 12 and the sound generators 18 of the acoustic emitters 16 for emitting the light pulses or sound pulses, respectively, directly upon activation or—with the aid of the timer 24—a predetermined time after activation. The light pulses or sound pulses can thus be emitted for example a predetermined time after actuation of the activation switch 28 or of the release mechanism, when the object distance captured by the distance sensor 30 falls below a predetermined limit value, a predetermined time after a throw or an impact of the dazzling element 10, etc.

The communication device 32 can be used to receive an activation signal from a remote control. In addition, the communication device 32 can serve for the communication of the control device 16 with control devices of other dazzling elements and/or a higher-level controller. In this way, the pulses of the emitters 12, 16 of different dazzling elements 10 can be coordinated with one another. For example, the light pulses or sound pulses can be emitted synchronously or in a well-defined pattern.

In addition, the dazzling element 10 is optionally also provided with a self-destructing device 34. Should a dazzling element 10 get into the hands of third parties and there is a risk that they will use the dazzling element 10 against oneself, the self-destructing device 34 can be activated by remote control via the communication device 32 in order to destroy the dazzling element 10, in particular its control device 20.

As is indicated in FIG. 1, the optical emitters 12 of the dazzling element 10 are preferably configured in such a way that they emit collimated light beams 36. The collimation of the light beams 36 is accomplished, for example, with the aid of optical elements 38, such as lenses or prisms.

According to the invention, the control device 20 is configured such that it controls the light-emitting means 14 of the optical emitters 12 in such a way that the light pulse sequences emitted by the light-emitting means 14 are adapted to the physiology of the human eye, i.e. in particular to the special properties of the human visual process. These special properties include, in particular, blink reflex, adaptation, physiological dazzling effect, temporal progression of the saturation of the cones in photopic vision, messenger sub-stance reduction in the bipolar cells, inverse proportionality of the light source size to the dazzling effect, independence of the dazzling effect from the light color, etc.

In normal photopic vision, the brightness perceived by the human eye depends on the excitation of the cones in the eye, which are sensitive to different wavelengths. The perception of brightness is greater, the lower the reduction of the messenger substances at the bipolar cells. Due to the relative slowness of the transmission of messenger sub-stance, pulsed light beams with pulse frequencies greater than 50 Hz are perceived as constant brightness. The perceived brightness is then proportional to the area "luminance over time" and, due to the different sensitivities of L, M and S cones, also depends on the color of the light source.

From luminance levels of $1\times10^4$ to $1.6\times10^6$ cd/m$^2$, the eye can no longer adapt, i.e. the cones are saturated (physiological glare), and no change in messenger substance is generated any more at the bipolar cells. This also applies to light sources that do not occupy the entire field of view. It is important to note in particular that the smaller the light source, the stronger the dazzling effect will be. In the case of dazzling, the dazzling effect is also only slightly dependent on the light color. Another relevant eye function is the blink reflex, which is usually completed after 250 ms at the latest.

Since most of the cones in the eye are located around the main visual axis, the source of the glare is more effective the closer it is to the visual axis. Since the very light-sensitive rods react particularly to stimuli from the peripheral field of vision and the line of sight is unconsciously directed toward this stimulus, this effect can also be used.

Figure 2:
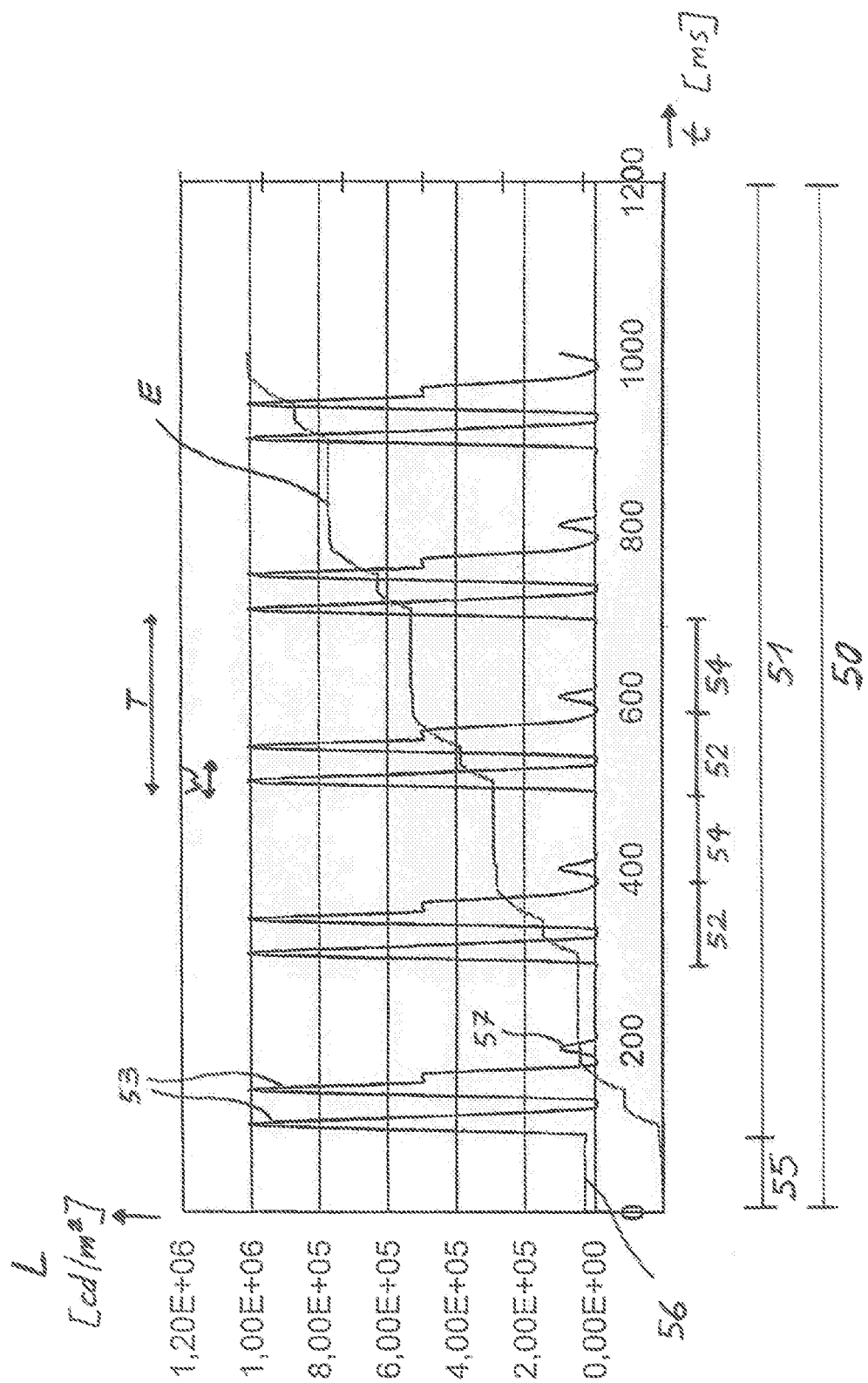
FIG. 2 is a graph showing a luminance-time diagram of a light pulse sequence according to an exemplary embodiment of the present invention, which can be generated with a dazzling element according to FIG. 1.

In a luminance-time diagram, FIG. 2 shows an example of an effective light pulse sequence 50 of the light emitted by a light-emitting means 14 of an optical emitter 12 of the dazzling element 10. In particular, LED arrays of LEDs with the highest possible photo-metric efficiency may be used as light-emitting means, wherein the light color plays no role here. The LEDs should be arranged as close to one another as possible.

The light pulse sequence 50 contains a disorientation sequence 51 and a pre-sequence 55 preceding it. In the pre-sequence 55, a stimulus light 56 perceptible by a target person is emitted, which does not yet bring about a disorienting effect on the target person, but draws the target person's attention and thus shifts the target person's line of sight towards the dazzling element 10. The stimulus light 56 can be configured as continuous light or a pulse sequence. The luminance L of the stimulus light 56 is at most $1 \times 10^3$ cd/m$^2$, and in the exemplary embodiment of FIG. 2 for example between approximately 200 and 500 cd/m$^2$. The duration of this pre-sequence 55 is approximately 100 ms, for example.

The disorientation sequence 51 contains alternately, one after the other, a plurality of dazzle pulse sequences 52 and a plurality of dazzle pauses 54. In the dazzle pulse sequences 52, two or three dazzle pulses 53 are emitted that are intended to bring about a dazzling effect on a target person. The dazzle pulses 53 each have a luminance of approximately $1 \times 10^6$ cd/m$^2$, a pulse width W in the range from 20 to 50 ms, and a pulse slope in the range from $0.5 \times 10^5$ cd/m$^2 \cdot$ms to $2.0 \times 10^5$ cd/m$^2 \cdot$ms.

In the dazzle pauses 54, no dazzling of the target person is intended to be brought about. The dazzle pauses 54 can therefore be configured without light emission. In the exemplary embodiment of FIG. 2, one or two stimulus pulses 57 are emitted in each of the dazzle pauses 54, which, similarly to the stimulus light 56 in the pre-sequence 55, are intended to (again) unconsciously direct the target person's attention to the dazzling element 10. The stimulus pulses 53 each have a luminance of at most approximately $1 \times 10^4$ cd/m$^2$ and a pulse width W likewise in the range from 20 to 50 ms.

The period duration T of a sequence of a dazzle pulse sequence 52 and a subsequent dazzle pause 54 lies within the blink reflex and is at most approximately 250 ms. In the exemplary embodiment of FIG. 2, the period duration T is approximately 200 ms. The duration of a dazzle pulse sequence 52 is at most approximately 200 ms, in the exemplary embodiment of FIG. 2 approximately 100 ms, and the duration of a dazzle pause 54 is at least approximately 50 ms, in the embodiment of FIG. 2 approximately 100 ms.

In the diagram of FIG. 2, a curve E is additionally plotted, which is intended to illustrate the cumulative electrical energy consumption of the light-emitting means 14. In comparison to a continuous sequence of dazzle pulses without dazzle pauses, the electrical energy consumption E is significantly reduced when the light pulse sequence 50 according to the invention is used. The energy saving can for example be more than 50%.

In addition to the above-described aspects of the pulse sequences, pulse shapes, and luminance levels, the light-emitting means 14 of the optical emitters 12 are also controlled by the control device 20 in such a way that the dazzle pulses 53 in the disorientation sequence 51 have a characteristic that brings about the greatest possible glare without causing permanent damage to the eyes of the target person.

For this purpose, dazzle pulses 53 having pulse widths W and light intensities I that, at a defined distance δ from the dazzling element 10, generate an irradiance that lies below a maximum permissible exposure of a target person or has a fixed ratio of at most 100% to a reference value indicating the maximum permissible exposure are generated. For example, an MPE value according to the standard DIN EN 60825-1 can be used as a reference value for the maximum permissible exposure.

In the case of a fixed pulse width and wavelength of the light beams emitted by the light-emitting means 14, the control device 20 can use a value that has been calculated once for the light intensity I. If variable pulse widths W and/or wavelengths of the dazzle pulses 53 are desired, the control device 20 must recalculate the light intensity I for each dazzle pulse 53.

The defined distance δ is, for example, an expected minimum distance D between the dazzling element 10 and the eyes of a standing target person (for example approximately 2 m) or a distance that is typical for the application situation of the dazzling element 10. In this case, the control device 20 can use a preset value for the light intensity I in the case of a fixed pulse width and wavelength of the light beams emitted by the light-emitting means 14.

Alternatively, the defined distance δ is dynamically determined on the basis of distances d between the dazzling element 10 and target persons who are captured by means of the distance sensor 30 of the dazzling element 10. The control device 20 determines, for ex-ample, the MPE value at the corresponding eye position from the distance d of the target person captured by the distance sensor 30 and then calculates the light intensity I and the pulse duration W for the dazzle pulses 53 such that the generated irradiance has a fixed ratio to the specific MPE value.

If there are a plurality of people in the effective region of the dazzling element 10 and the distance sensor 30 accordingly detects a plurality of distances d, the calculation is carried out taking into account the person who is closest to the dazzling element 10, i.e. the smallest captured distance d. Optionally, the captured distances d can also be averaged, optionally with a special weighting for example given to the closer distances.

If a plurality of dazzling elements 10 are used, the defined distance δ and the corresponding reference value can be determined either for each dazzling element 10 individually or taking into account the other dazzling elements 10 and the distances captured by them.

In addition, the ambient brightness can also be included in the calculation of the light in-tensities I and pulse widths W of the dazzle pulses 53. For this purpose, the dazzling element 10 can be equipped with a photosensor, for example, or can receive corresponding information via the communication device 32.

The following is a summary list of reference numerals and the corresponding structure used in the above description of the invention:

LIST OF REFERENCE NUMERALS

10 Electronic dazzling element
12 Optical emitter
14 Light-emitting means
16 Acoustic emitter
18 Sound generator
20 Control device
22 Driver
24 Timer
26 Energy store
28 Activation switch
30 Distance sensor
32 Communication device
34 Self-destructing device
36 Collimated light beam 38 Optical element, especially lens or prism
50 Light pulse sequence
51 Disorientation sequence
52 Dazzle pulse sequence
53 Dazzle pulses
54 Dazzle pause
55 Pre-sequence
56 Stimulus light
27 Stimulus pulses
d Distance
D Specified minimum distance
δ Defined distance
E Electrical energy
I Light intensity
L Luminance
T Period duration
W Pulse width

The invention claimed is:

1. A method for operating an electronic dazzling element for emitting light pulses to disorient people and confuse sensor systems, the dazzling element having at least one optical emitter with at least one electronic light-emitter for emitting light pulses, the method comprising:
controlling the at least one electronic light-emitter of the at least one optical emitter in such a way that a light pulse sequence emitted by the at least one electronic light-emitter is adapted to a physiology of a human eye, and thereby to the properties of the human process by;
forming the light pulse sequence with a disorientation sequence in which alternately, one after another, a plurality of dazzle pulse sequences with a plurality of dazzle pulses are emitted to bring about a disorienting effect on a target person and a plurality of dazzle pauses without the dazzle pulses are emitted, a period duration of one sequence having a dazzle pulse sequence and a subsequent dazzle pause being at most 250 ms; and/or
forming the light pulse sequence with a disorientation sequence in which a plurality of dazzle pulses is emitted to bring about a disorienting effect on a target person, and the light pulse sequence furthermore contains a pre-sequence preceding the disorientation sequence in which stimulus light, which is perceptible by the target person, is emitted having a luminance of at most $1 \times 10^3$ cd/m² to draw the target person's attention and thus shift the target person's line of sight towards the dazzling element.

2. The method according to claim 1, which further comprises forming the light pulse sequence with a disorientation sequence in which a plurality of dazzle pulses are emitted to bring about a disorienting effect on a target person, wherein the dazzle pulses each have a luminance of at most $1.6 \times 10^6$ cd/m².

3. The method according to claim 1, which further comprises forming the light pulse sequence with a disorientation sequence in which a plurality of dazzle pulses are emitted to bring about a disorienting effect on a target person, wherein the dazzle pulses each have a pulse slope in a range from $0.5 \times 10^5$ cd/m²·ms to $2.0 \times 10^5$ cd/m²·ms.

4. The method according to claim 1, which further comprises forming the light pulse sequence with a disorientation sequence in which a plurality of dazzle pulses are emitted to bring about a disorienting effect on a target person, wherein the dazzle pulses each have a pulse width in a range from 20 ms to 50 ms.

5. The method according to claim 1, which further comprises emitting at least one stimulus pulse emitted in each of the dazzle pauses of the disorientation sequence without bringing about the disorienting effect on the target person.

6. The method according to claim 1, which further comprises forming the light pulse sequence with a disorientation sequence in which a plurality of dazzle pulses are emitted to bring about a disorienting effect on a target person, wherein the dazzle pulses have such pulse widths and light intensities that they generate, at a defined distance from the dazzling element, an irradiance below a maximum permissible exposure of the target person.

7. The method according to claim 6, which further comprises capturing distances between the dazzling element and the target person and the defined distance is determined in dependence on the distances captured.

8. The method according to claim 7, wherein in a case when a plurality of dazzling elements are used, the light pulse sequence emitted by the at least one electronic light-emitter is adapted to distances from target persons captured by other ones of the dazzling elements.

9. The method according to claim 6, wherein the defined distance is an expected minimum distance between the dazzling element and eyes of the target person.

10. The method according to claim 1, which further comprises emitting the light pulses of the at least one optical emitter as collimated light beams.

11. The method according to claim 1, which further comprises using a plurality of dazzling elements, the light pulse sequence emitted by the at least one electronic light-emitter is adapted to the light pulse sequences emitted by the at least one electronic light-emitters of other ones of the dazzling elements.

12. An electronic dazzling element, comprising:
at least one optical emitter having at least one electronic light-emitter for emitting light pulses; and
a controller for controlling said at least one electronic light-emitter of said at least one optical emitter, said controller is configured
for performing the method for operating the electronic dazzling element according to claim 1.

13. The method according to claim 1, wherein each of the dazzle pauses is at least 50 ms.

* * * * *